Jan. 29, 1957  G. H. MADANY  2,779,537
FLUID CONTACTING APPARATUS
Filed Aug. 1, 1950  3 Sheets-Sheet 1
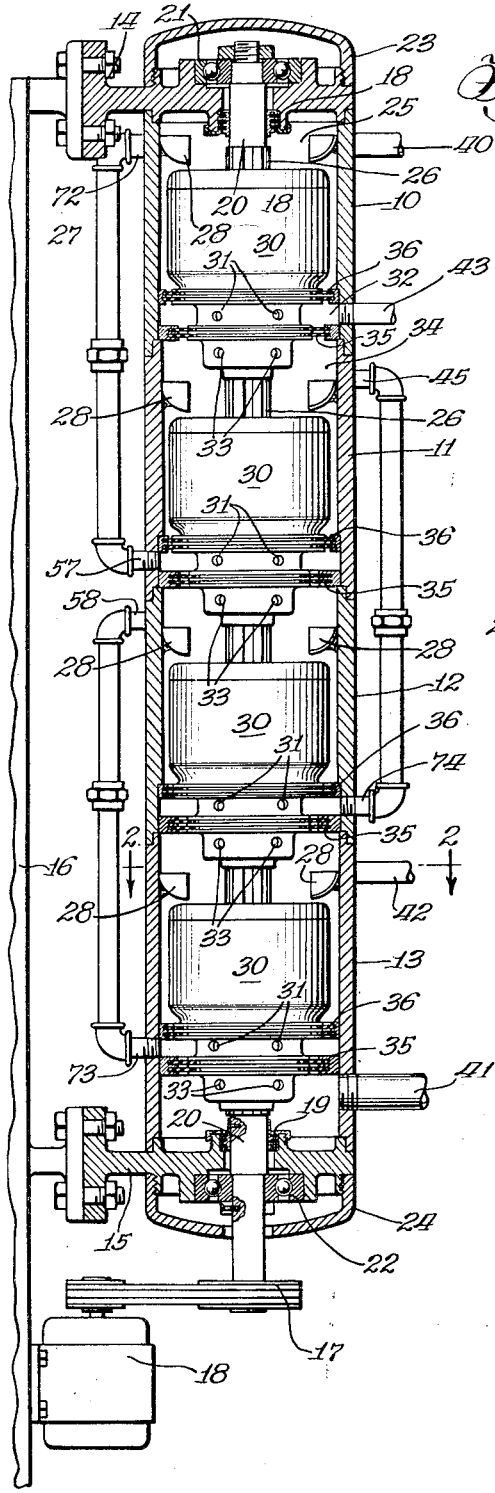
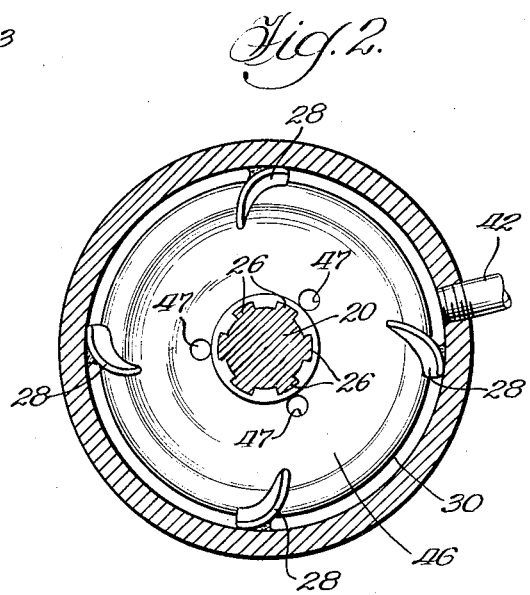
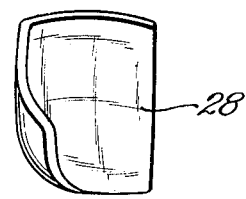
INVENTOR.
George H. Madany
BY
Foorman L. Mueller
Atty.

Jan. 29, 1957 G. H. MADANY 2,779,537
FLUID CONTACTING APPARATUS
Filed Aug. 1, 1950 3 Sheets-Sheet 2
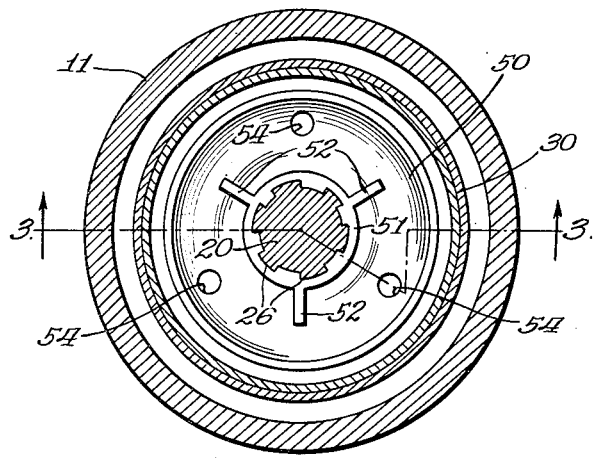
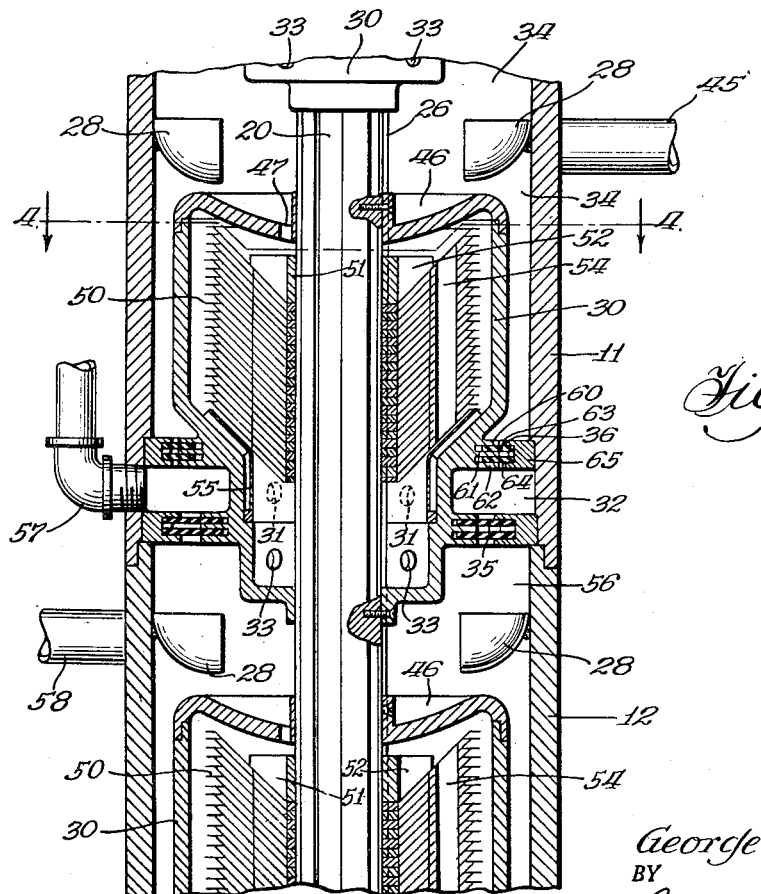
INVENTOR.
George H. Madany
BY
Foorman L. Mueller
Atty.

Jan. 29, 1957   G. H. MADANY   2,779,537
FLUID CONTACTING APPARATUS
Filed Aug. 1, 1950   3 Sheets-Sheet 3

INVENTOR.
George H. Madany
BY Foorman L. Mueller
Atty.

United States Patent Office 2,779,537
Patented Jan. 29, 1957

2,779,537
FLUID CONTACTING APPARATUS

George H. Madany, Iowa City, Iowa, assignor of one-eighth to Samuel D. Jarvis and one-eighth to Vernon D. Jarvis, Decatur, Ill.

Application August 1, 1950, Serial No. 177,092

16 Claims. (Cl. 233—15)

This invention relates generally to apparatus for providing contact between a plurality of fluids and more particularly to a device for providing successive contact and separation of partly or wholly immiscible fluids of different densities for effecting extraction of a constituent from one of the fluids or to promote a chemical reaction between the fluids or constituents thereof.

There are many applications in which it is desired to process a liquid mixture to extract a component therefrom or to provide a chemical reaction therewith. For such operations, devices have been provided in which liquids are brought into contact with each other and counter-current flow with respect to each other, or co-current flow is provided therebetween. Such operations may be practiced with liquid mixtures for removing either a solid or liquid component from one liquid called the feed liquid and applying the same to the second liquid called the solvent. To provide such action the liquids must be partially or wholly immiscible and must be of different densities. A solvent must be used which is selective for the component to be extracted so that when the liquids are mixed and equilibrium is reached, the solvent contains a large part of the component to be extracted.

In order to provide effective extraction it has been necessary in many cases to repeat the processes a great number of times, thereby making the process unduly long and requiring a great amount of equipment. This may be unsatisfactory in certain instances in which the materials to be extracted are adversely effected by relatively long periods of contact between the feed liquid and the solvent. In providing such a device, in addition to providing a unit which is simple and efficient, it is also desirable to provide one which is satisfactory for use when operating with various different materials. That is, the device preferably should be suitable for use for performing various different operations by simple changes such as by changes in the operating speed or in the path of flow through the various stages of the device. This is to be contrasted with present designs in which machines used are tailor-made to particular jobs and therefore production manufacturing with the attending savings is not possible.

It is therefore an object of the present invention to provide an improved device for producing successive contact and separation of fluids of different densities.

A further object of this invention is to provide a simple device of general application for effecting liquid-liquid extraction between partly or wholly immiscible liquids of different densities.

Another object of this invention is to provide a device for effecting rapid and efficient extraction of a material from a feed liquid by successive stages of thorough mixing and rapid separation by centrifugal action.

Still another object of this invention is to provide liquid extracting apparatus having improved seals for preventing leakage of liquid which is under high pressure between relative rotating parts of the apparatus.

A feature of this invention is the provision of a liquid contacting device including rotary stirring means for thoroughly mixing liquids and centrifugal separator means for providing rapid efficient separation of the mixed liquids. The stirring means and separator means of a plurality of stages may be provided on a single shaft resulting in a single rotating structure.

A further feature of this invention is the provision of a liquid extracting system having stages providing mixing and separation of liquids of different densities, in which the stages may be interconnected for counter-current flow or for co-current flow through the system.

Another feature of this invention is the provision of a liquid extractor including a centrifugal separator having closely spaced discs between which the liquids being separated travel as films moving counter-current to each other and scrubbing each other to effect the extraction with a very short length of travel.

Still another feature of this invention is the provision of a high pressure liquid seal between relatively moving members including a rigid element on one of the members having portions interleaved with portions of a somewhat resilient element of the other member. The interleaved portions form a labyrinth which provides a long tortuous path and slight changes of alignment are absorbed by the resilient material so that no damage is caused thereby.

Further objects, features and advantages will be apparent from a consideration of the following description taken in connection with the accompanying drawings in which:

Fig. 1 illustrates the liquid-liquid contacting device including a plurality of different stages;

Fig. 2 is a cross sectional view along the lines 2—2 of Fig. 1;

Fig. 3 is an enlarged cross sectional view of one stage of the extractor device;

Fig. 4 is a cross sectional view along the lines 4—4 of Fig. 3;

Fig. 5 is a detailed view of the deflectors;

Figure 7:
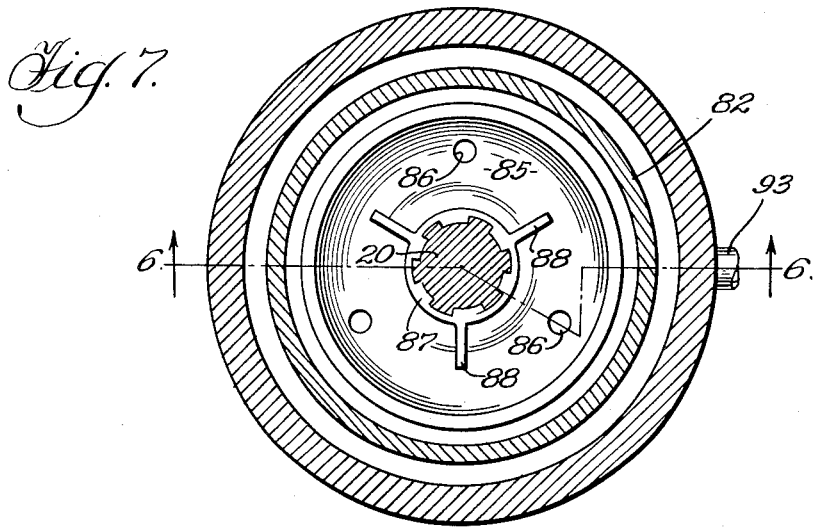
Fig. 7 is a cross sectional view along the line 7—7 of Fig. 6.

In practicing the invention there is provided a liquid-liquid contacting device which includes a plurality of stages. The various stages each include a mixing section and a separating section with the mixing section including stirring means which may be mounted on the same shaft as centrifugal separator means provided in the separating sections. Seals are provided between the rotating housing of the separator means and the outer supporting housing of the device so that separate chambers for the liquids of different densities, separated in the separating sections, are provided. The rotating units of the various stages can be supported on a single shaft with all of the elements being driven together. The plurality of chambers, provided within the main supporting housing by the seals, may be connected in various desired ways by pipes or the like which extend along the side of the main housing. The connections may be arranged so that the light and heavy liquids flow from stage to stage providing either counter-current or co-current flow.

In Fig. 1 there is shown a complete system in accordance with the invention. The liquid extracting apparatus includes a housing made up of cylindrical sections 10, 11, 12 and 13 each of which encloses the structure forming one stage of the system. The housing sections are supported by brackets 14 and 15 which may be supported from a frame 16. A driving motor 18 may also be mounted on the frame 16 for driving the unit and may be connected thereto through the pulley 17. A single shaft 20 extends vertically through the device and is supported from the brackets 14 and 15 by bearings 21 and 22 respectively. End covers 23 and 24 complete the housing for the system.

Each of the stages includes a mixing chamber 25 into which both the heavy and light liquids are introduced. The shaft 20 has relatively large splines 26 thereon which cause rigorous stirring action within the chamber 25. The mixture is driven by the splines against stators 28 which are curved to deflect the mixture toward the center of the centrifuge 30. The centrifuge 30 includes separator discs for separating the liquid mixture as will be more fully set forth, with the heavy liquid being discharged through the openings 31 into the chamber 32 and the light liquids being discharged through the openings 33 into the chamber 34. The chamber 34 is actually the mixing chamber of the next stage which extends from the seal 35 down along the shaft 20 to the centrifuge 30 of the next lower section and about the centrifuge to the seal 36. The seals 35 and 36 of each stage define a chamber in which the heavy liquid derived from each stage enters and from which it is applied to the mixing chamber of the preceding stage.

It is apparent from Fig. 1 that the light liquid is applied at the top of the system through inlet 40 and continues down through the stages and is discharged through the outlet 41 at the bottom of the unit. The heavy liquid is introduced at the inlet 42 which is at the top of the lowest stage and is applied successively through the stages from the separating section of each stage to the mixing section of the stage above until it passes through all of the stages and is drawn off at the outlet 43.

Considering the structure now more in detail, reference is made to Figs. 2, 3, 4 and 5. Fig. 3 is a cross sectional view of the stage included within the housing section 11. Light liquid enters the mixing chamber 34 of the stage through the openings 33 of the centrifuge 30 of the stage immediately above, and heavy liquid may be introduced through the pipe 45 which enters the mixing chamber 34. The liquids in the chamber 34 will be mixed because of the rotation of the shaft 20 and the centrifuge 30. The splines 26 on the shaft 20 and the surface of the centrifuge 30 both tend to impart motion to the liquid in the chamber 34 to cause mixing thereof. The stators 28 deflect the liquid toward the concave top surface 46 of the centrifuge 30 so that the liquid mixture passes through the opening 47 into the centrifuge itself.

Within the centrifuge bowl are a plurality of conical discs 50 stacked one on top of the other but spaced from each other. Above the disc is a collar 51 having three vanes 52 extending therefrom for imparting a rotary motion to the liquid mixture entering the centrifuge. The discs have symmetrically spaced openings 54 through which the liquid mixture can travel down through the stack of conical discs. The rapid rotation of the discs will cause separation of the light and heavy liquids, with each liquid forming a film on the discs and the two films moving in opposite direction so that the liquids thereby rub over each other and intimate contact therebetween is provided. A funnel-like divider 55 is provided below the discs for separating the paths of the heavy and light liquids. The heavy liquid is thrown against the inside surface of the bowl 30 and flows down between the bowl and the divider and out through the openings 31 into the chamber 32. The light liquid continues down through the openings 54 in the discs and on the inside of the divider 55 into the bottom of the centrifuge and thereby has access to the openings 33 through which it flows into the chamber 56 which becomes the mixing chamber of the next stage. The heavy liquid from the stage 11 flows from the chamber 32 through the outlet 57 and heavy liquid for the following stage enters the mixing chamber 56 through the inlet 58.

As previously stated, seals 35 and 36 are required about the centrifuge to separate the heavy and light liquids and provide the required mixing chambers. Seals are also required at the top and bottom of the unit as indicated by 18 and 19 of Fig. 1. The construction of the seals will be apparent from a consideration of the seal 36 of Fig. 3. Formed on the bowl of the centrifugal separator are spaced annular projections 60, 61 and 62. These projections may be made integral with the separator bowl which is constructed of steel or other similar material. Supported from the housing section 11 are a pair of rings 63 and 64 which are made of a material which is tough and yet somewhat resilient. The rings 63 and 64 are secured to a mounting 65 which holds the rings in fixed position. As the centrifuge 30 rotates, the projections 60, 61 and 62 rotate with respect to the rings 63 and 64. The projections and the rings therefore form a labyrinth which restricts the passage of liquid thereby. The rings must be made of a material which will not be effected by the liquids being used in the device and therefore should be a material which is inert chemically such as the plastic material known as "Teflon." As previously stated, the rings must be somewhat resilient to prevent damage to the projecting rims or the rings in the event there is slight misalignment therebetween. It is apparent that the pressure of the liquid will cause the rings to be deflected against the projections and this action will improve the sealing effect. In the present application it is not necessary that an absolutely tight seal be provided but that a substantially complete seal be provided. The tortuous path provided by the projections and the ring is aided by the centrifugal force, which throws the liquid away from the seal, in preventing leakage of liquid past the seal.

As previously stated, the liquid contactor device in accordance with the invention may be used in many different ways. For example, it may be used for extracting a constituent from a liquid mixture by use of a solvent, and for providing contact between liquids to promote a chemical reaction therebetween. In extraction processes a solvent must be selected which is selective for the constituent to be extracted and which has a different density than that of the feed liquid. By thoroughly mixing the feed liquid and the solvent an equilibrium condition is reached in which the constituent to be extracted is transferred to the solvent. Such transfer is continued in the separating operation by providing rubbing contact between the feed liquid and the solvent. In the structure disclosed the mixing and separation are very rapidly performed permitting the processing of a large quantity of material efficiently and at lost cost.

As specific examples of extracting operations, the machine is suitable for use in extracting penicillin, streptomycin, chloromycetin, vitamin A and other pharmaceutical preparations from the oils in which they are found. The machine may also be used for the fractionation of vegetable oils such as soy bean oil into drying and non-drying components. The machine may also be used in the refining of lubricating oil to separate the naphthinic constituents from the desirable paraffinic constituents. It is apparent that in some of the above processes a desired constituent is removed from a feed liquid so that the part removed can be used in various ways. However, as in the refining process mentioned, it may be desired to remove a constituent from a feed liquid to improve the characteristics of the feed liquid. Therefore it may be the processed liquid or raffinate which is the desired product or it may be the material extracted by a solvent which is the main desired product of the process using the device.

Depending upon the process in which the device is used, the number of stages required and the interconnection of stages may vary. As previously stated, the stages may be connected to provide countercurrent liquid-liquid contact and separation. The connections between the stages in the device shown in Fig. 1 provides such a process. That is, the heavy liquid enters at tube 42 and passes first through the stage within the housing section 13, then to the stage within the housing section 12, and then to the stages within housing sections 11 and 10 in that order. The light liquid, on the other hand, enters the inlet 40 and passes through the stages in the sections 10, 11, 12 and 13 in that order. This arrangement might be particularly advantageous when a light solvent is used to extract a component from a heavy liquid mixture. In such case the light solvent is fresh when it contacts the heavy feed liquid as it approaches the end of the process. The solvent therefore is highly effective to remove the substance to be extracted from the feed liquid. The solvent then contacts the feed liquid at a stage in which less of the material extracted has been removed and through the contact and separation process removes more of the material from the feed liquid. This process continues with the solvent containing a large amount of the material to be extracted when it contacts the fresh feed liquid before any material has been extracted therefrom. It is apparent from the above that the fresh solvent contacts the feed liquid just before it is discharged and this makes for efficient extraction.

The structure as illustrated can also be used for co-current multiple contact extraction in which heavy liquid is introduced into each stage as through the pipes 42, 58, 45 and 72. The heavy liquid is then discharged through the outlets 73, 74, 57 and 43 respectively. The light liquid will be introduced at 40 and pass down through the stages in the housing sections 10, 11, 12 and 13 as in the countercurrent process. It is therefore obvious that the machine is adaptable for various extractions and contact processes.

Considering now a specific example of the use of the machine, the operation for improving the viscosity index of oils by removing the naphthenic constituents and retaining the paraffinic constituents will be described. The number of stages and the particular process used will depend upon the quality of the oil being processed and the quality desired in the product obtained. The solvent used may be any one of several which are selective for the naphthenic constituents of the oil. Chlorex, phenol, furfural, crotonaldehyde, cresylic acid and other materials are suitable for use for this purpose. The ratio of the solvent to the feed liquid depends upon the amount of extraction desired. Assuming that furfural is used as the solvent, in a ratio of two parts of solvent to one part of oil, the furfural having the higher density will be introduced at 42 and the oil will be introduced at 40. The size of the machine and speed of operation will depend upon the quantity of material it is desired to process within a given time. As an example, a structure as in Fig. 1 may be used with the centrifugal separators having a diameter of approximately five inches. For such a structure the required speed would be about 5,000 revolutions per minute. Four stages as shown would normally be satisfactory. The oil after having been so processed will appear as a raffinate having increased viscosity index, decreased viscosity, greater resistance to sludging, an increased pourpoint, reduced tendency toward carbon deposition, and improved color. Although in such a process it is necessary that the feed liquid and the solvent have different densities, in the structure shown it is not necessary that there be a sharp difference in density, as the machine tends to magnify any difference in density through the very effective centrifugal action.

Figure 6:
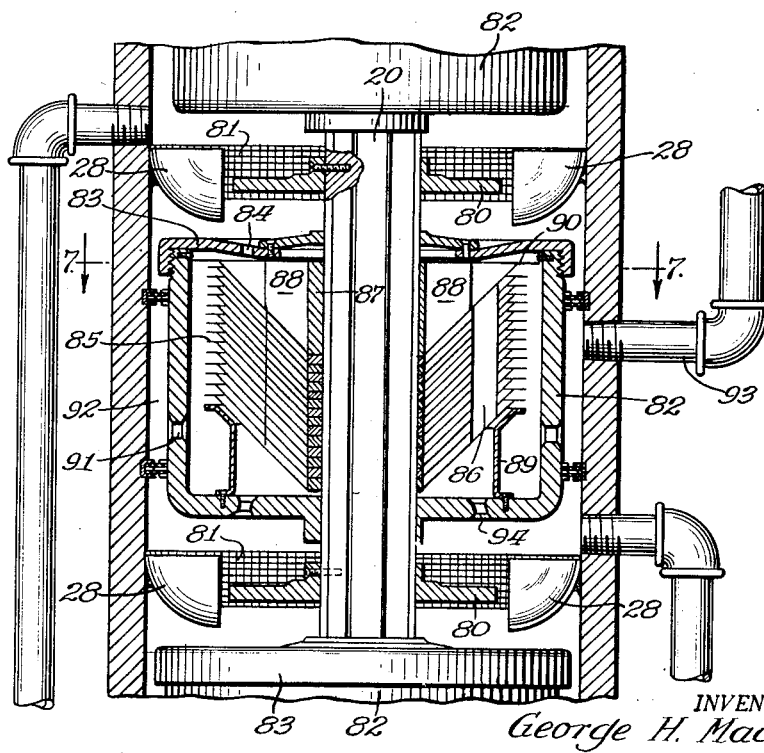
Fig. 6 is an enlarged cross sectional view of a modified device.

In Fig. 6 and 7 there is illustrated a modified form of the invention, which is fundamentally similar to that of Fig. 1 to 5 inclusive, but which differs somewhat in structure. To make the mixing more vigorous, a stirrer 80 may be provided on the shaft 20 which provides very thorough mixing of the feed liquid and the solvent. Around the stirrer 80 is a mesh screen 81 which serves to reform the drops of mixture driven therethrough by the stirrer 80, before they reach the stators 28. The stators 28 may be similar to those in the embodiment previously described. The centrifuge 82 is of somewhat different construction than that of the previous embodiment and includes a cover 83 having openings 84 therein through which the mixture enters the centrifuge. Conical discs 85 are provided generally similar to the discs of the previous embodiments and have openings 86 therein through which the mixture passes down through the discs. Above the top discs is a collar 87 having vanes 88 thereon for imparting rotary motion to the mixture as previously described. A funnel-like divider 89 is also provided for separating the paths of the light and heavy liquids. To prevent the mixture from passing around the edge of the discs and not being processed thereby, the top disc, designated 90, extends all the way to the edge of the centrifuge bowl so that liquid can pass down through the bowl only through the openings 86. Heavy liquid is forced to the edge of the bowl and leaves the separator bowl through openings 91 into the chamber 92 from which it is removed through the pipe 93. The light liquid leaves the centrifuge through the openings 94 and passes down into the next stage of the device. It will be apparent that the structure of Figs. 6 and 7 can be used in various systems in exactly the same manner as the structure of Figs. 1 to 5 inclusive.

From the above disclosure it is seen that a device has been provided which is highly effective in processes in which a component is extracted from a feed liquid, either for improving the characteristics of the feed liquid or for obtaining a constituent from the feed liquid. The device may include a plurality of stages which may be interconnected for counter-current or co-current liquid-liquid contact. A plurality of stages may be constructed with all operating elements on a single shaft so that a single driving means is required and the entire structure is thereby simplified. Each stage provides thorough mixing of the immiscible liquids of different densities and thereafter separation of the two liquids. The separation takes place between very closely spaced discs so that the liquids come in intimate contact and in an extraction process the equilibrium between the liquid is effected very rapidly. This is particularly important when extracting a substance such as pencillin wherein the product is adversely effected by long periods of contact between the feed liquid and solvent. It is obvious that the temperature of the liquids may be held at desirable values for effecting the process carried on.

Although the various structure of the device disclosed has been illustrated for vertical mounting, it is obvious that the unit may also be mounted and operated horizontally. There are certain advantages in a horizontal unit in that the heavy liquid can be more easily moved from one stage to the next in counter-current processes and will not have to be lifted up from one stage to the next. Also, the back pressure in the individual centrifuges or separators is reduced by providing a horizontal unit. It is obvious that as to whether the device should be mounted and operated as a vertical or a horizontal unit will depend on the application for which it is used. The size of the unit, number of stages, and processes to be carried out therewith will all have some effect on whether a horizontal or vertical unit will be more satisfactory.

As previously stated, the characteristics of the unit can be changed by changing the connections between the stages and by changing the speed of operation. Changes can also be made by changing the discs in the separators to provide different disc spacings. Also, the stirring action can be regulated by the characteristics of the stirrer or by complete elimination of the stirrer and use only of the splines and the rotating housing of the centrifuge to provide mixing action.

The apparatus has been described for use in connection with liquids, but it is also applicable for use with fluids other than liquids, and the invention is therefore not limited in its application to liquids. Although certain embodiments of the invention have been disclosed which are illustrative thereof, it is obvious that various changes and modifications can be made therein without departing from the intended scope of the invention as defined in the appended claims.

I claim:

1. Apparatus for providing rapid contact and separation of fluids of different densities which are at least partially immiscible, said apparatus including a stationary elongated tubular housing and a rotatable shaft extending longitudinally thereof, means to rotate said shaft, means forming a plurality of stages within said housing each of which includes means for thoroughly mixing said fluids and means for separating said fluids, said mixing means including rotating means secured to said shaft and stator means secured to said housing for deflecting the mixture towards said separating means, said separating means being supported on said shaft and having a housing with an inlet for said mixture and a plurality of nested frusto-conical discs in said housing providing close spaced conical portions between which said fluids are each forced in opposite directions respectively by rotation thereof so that substantial contact is provided therebetween, and means interconnecting said stages providing separate paths for the flow of said fluids of different densities from the separating means of each stage to the mixing means of an adjacent stage.

2. Apparatus for providing rapid contact and separation of liquids of different densities which are at least partially immiscible, said apparatus including a stationary elongated tubular housing and a rotatable shaft extending longitudinally thereof, means to rotate said shaft, means forming a plurality of stages within said housing, each of which includes means for thoroughly mixing said liquids and means for separating said liquids, said mixing means including portions projecting from said shaft and rotating therewith and stator means secured to said housing for deflecting the mixtures towards said separating means, said separating means including bowls secured to said shaft and having an inlet for said mixtures and close spaced nested frusto conical discs therein between which said liquids are each forced in opposite directions respectively by rotation thereof so that substantial contact is provided therebetween, means interconnecting said stages to provide flow of liquid of one density through said stages in a particular order from said separating means of each stage to said mixing means of another stage, and to provide flow of liquid of a different density through said stages in the reverse order from said separating means at each stage to said mixing means of another stage.

3. Apparatus for providing rapid contact and separation of liquids of different densities which are at least partially immisicible, said apparatus including an elongated tubular housing, a shaft mounted for rotation longitudinally within said housing, a plurality of stages within said housing positioned adjacent to each other and each including mixing means and separating means, each of said separating means including a bowl like enclosure mounted on said shaft having close spaced discs therein through which said liquids pass to separate the same, means forming a pair of seals between each enclosure and said housing whereby mixing chambers are provided which extend between adjacent enclosures and annular chambers are provided about said enclosures, said mixing means being in said mixing chambers and cooperating with said shaft for mixing the liquids therein, said enclosures of said separating means of each stage having inlet openings for receiving the liquid mixture from the mixing chamber of the stage, first outlet openings for providing passage of the more dense liquid from said enclosure into said annular chamber thereabout, and second openings for providing passage of the less dense liquid from said enclosure into the mixing chamber of the next stage.

4. Apparatus for extracting one constituent from a feed liquid by the use of a solvent which is selective for said one constituent, said apparatus including a housing having therein at least one stage comprising means for thoroughly mixing said feed liquid and said solvent and means for separating said solvent and said feed liquid, a rotary shaft and means to rotate the same, said mixing means including rapidly rotating rib portions on said shaft for imparting rotary motion to said mixture and stator portions supported on said housing for deflecting the mixture toward said separating means, said separating means including means for receiving said mixture and close spaced nested frusto conical discs connected to rotate with said shaft so that said liquid mixture and said solvent each flow therebetween in opposite directions respectively and substantial rubbing contact is provided for transferring said one constituent to said solvent.

5. Apparatus for extracting one component from a feed liquid by the use of a second liquid which is selective for said component and which has a density different from that of said feed liquid, said apparatus including an elongated tubular housing, a shaft mounted for rotation longitudinally within said housing, mixing means and separating means positioned alternately along said shaft, said separating means including substantially closed bowl supported on said shaft and having a plurality of close spaced conical discs therein between which said liquids flow for separating the same, dividing means providing separate compartments within said bowls for the liquids of different density separated by said discs, means forming seals between said bowls and said housing to define a plurality of chambers within said housing, alternate chambers extending between adjacent separating bowls and forming mixing chambers in which said feed liquid and said second liquid are mixed, said bowls having inlets individually communicating with the mixing chambers on one side thereof for receiving said liquid mixture therein, said bowls having outlet openings providing passage of the less dense liquid into the mixing chamber on the side of said bowl opposite to said one side, said bowls having additional outlet openings providing passage of the more dense liquid into the chambers intermediate said mixing chambers, and means interconnecting said intermediate chambers and said mixing chambers.

6. Apparatus for extracting one component from a feed liquid by the use of a second liquid which is selective for the said component and which has a density different from that of said feed liquid, said apparatus including an elongated tubular housing, a shaft mounted for rotation longitudinally within said housing, mixing means and separating means positioned alternately along said shaft, said separating means including substantially closed bowls supported on said shaft and having close spaced discs therein, means forming seals between said bowls and said housing to define a plurality of chambers within said housing, alternate chambers extending between adjacent separating bowls and forming mixing chambers in which said feed liquid and said second liquid are mixed, said bowls having inlets individually communicating with the mixing chambers on one side thereof for receiving said liquid mixture therein, said bowls having dividing means therein providing separate compartments for the liquids of different density separated by said discs, said bowls having outlet openings providing passage of the less dense liquid into the mixing chamber on the side of said bowl opposite to said one side, said bowls having additional outlet openings providing passage of the more dense liquid into the chambers intermediate said mixing chambers, and means interconnecting said intermediate chambers and said mixing chambers.

7. Apparatus for extracting one component from a feed liquid by the use of a second liquid which is selective for said one component and which has a density different from that of said feed liquid, said apparatus including an elongated tubular housing, a rotatable shaft mounted longitudinally within said housing, mixing means and separating means positioned along said shaft, said separating means including a substantially closed bowl having close spaced discs therein, means forming seals between said bowl and said housing to define a plurality of chambers within said housing, said mixing means being positioned within one of said chambers and operating to mix said feed liquid and said second liquid therein, said bowl having inlet means for receiving said mixed liquids therein, and dividing means within said bowl providing separate compartments therein for liquids of different densities separated by said discs, said bowl having openings therein providing communication between said compartments and additional ones of said chambers, with the least dense liquid and the more dense liquid being discharged into separate chambers.

8. Apparatus for extracting one component from a feed liquid by the use of a second liquid which is selective for said components and which has a density different from that of said feed liquid, said apparatus including an elongated tubular housing, a rotatable shaft mounted longitudinally within said housing, mixing means and separating means positioned along said shaft, said separating means including a substantially closed bowl having therein a plurality of conical shaped discs which are closely spaced to provide a narrow passage therebetween, said bowl being secured to said shaft and rotating therewith to cause rotation of said discs to provide separation of the liquids within said bowl, dividing means providing separate compartments within said bowl for said liquids of different densities separated by said discs, means forming seals between said bowl and said housing to define a plurality of chambers within said housing, said mixing means being positioned within one of said chambers and including a portion secured to said shaft and a portion secured to said housing for mixing said feed liquid and said second liquid therein, said bowl having inlet openings for receiving said mixed liquids therein and separate outlet openings for discharge of said feed liquid and said second liquid into separate ones of said chambers.

9. Apparatus for providing separation of liquids of different densities, said apparatus including an elongated tubular housing, a shaft mounted for rotation longitudinally within said housing, separating means secured to said shaft including a bowl-like housing having close spaced portions therein through which said liquids pass to separate the same, and means including a seal between said bowl-like housing and said tubular housing for providing separate chambers about said separating means, said seal including spaced annular portions secured to said bowl-like housing and to said tubular housing which are of such configuration to form a labyrinth which prevents the flow of liquid therethrough, said annular portions secured to one of said housings being formed of resilient material which is relatively inert chemically, said bowl-like housing having openings therein communicating with said chambers to provide passage of said liquids between said separating means and said chambers.

10. Apparatus for providing separation of liquids of different densities, said apparatus including an elongated tubular housing, a shaft mounted for rotation longitudinally within said housing, separating means secured to said shaft including a substantially closed bowl having close spaced portions therein through which said liquids pass to separate the same, and means including a seal between said bowl and said housing for providing separate chambers about said bowl, said seal including a first plurality of spaced projecting annular portions on said bowl and a second plurality of spaced projecting annular portions on said housing, said portions being spaced to substantially fill the space therebetween said rims and forming a labyrinth which prevents the flow of liquid therethrough, at least one of said plurality of annular portions being formed of resilient material, said bowl having openings therein communicating with said chambers to provide passage of said liquids therebetween.

11. Apparatus for providing rapid contact and separation of liquids of different densities which are at least partially immiscible, said apparatus including an elongated tubular housing, a shaft mounted for rotation longitudinally within said housing, a plurality of stages with said housing each including mixing means and separating means with said mixing means and said separating means being alternately positioned along said shaft, each of said separating means including a bowl-like enclosure mounted on said shaft having close spaced portions therein through which said liquids pass to separate the same, and means forming a pair of seals between each enclosure and said housing whereby mixing chambers are provided which extend between enclosures of adjacent separating means and annular chambers are provided about said enclosures, said seals including a plurality of annular spaced rigid projecting rims on said enclosure and resilient annular rings secured to said housing, said rings being of such configuration to substantially fill the space between adjacent rims and forming a labyrinth therewith which prevents the flow of liquid therethrough, said mixing means being positioned in said mixing chambers and cooperating with said shaft for mixing the liquids therein, said enclosures having openings communicating with said chambers to provide passage of liquids separated therein to said chambers.

12. Apparatus for providing rapid contact and separation of a first relatively light liquid and a second relatively heavy liquid which are at least partially immiscible for transferring a constituent from one liquid to the other, said apparatus including in combination, a plurality of stages positioned vertically one above the other, each of said stages comprising a mixing portion and a separating portion, said mixing portion including means for combining and mixing said first and second liquids, means for applying the mixed liquids from said mixing portion to said separating portion, said separating portion including a plurality of nested frusto-conical discs and means for rotating the same to cause movement of said first and second liquids between said discs in opposite directions to separate the same, means providing a passage from adjacent the center of said discs of one stage to said mixing portion of the next lower stage through which said first liquid flows by gravity, and means providing a passage from adjacent the outer edge of said discs of one stage to said mixing portion of the next higher stage through which said second liquid is pumped through the centrifugal action of said separating means.

13. Apparatus for providing rapid contact and separation of a first relatively light liquid and a second relatively heavy liquid which are at least partially immiscible for transferring a constituent from one liquid to the other, said apparatus including in combination, a plurality of stages positioned vertically one above the other, each of said stages comprising interconnected portions including a mixing portion and a separating portion, said mixing portion including relatively rotating means for combining and throroughly mixing said first and second liquids and for applying the mixed liquids to said separating portion, said separating portion including a plurality of nested frusto-conical discs mounted for rotation, said rotating parts of said mixing portions and said separating portions of all said stages being interconnected and forming a single rotating unit, means for rotating said unit for mixing said liquids in said mixing portions and to cause movement of said first and second liquids in opposite directions between said discs in said separating portions, means providing a passage from adjacent the center of said discs of one stage to said mixing portion of the next lower stage through which said first liquid flows by gravity, and means providing a passage from adjacent the outer edge of said discs of one stage to said mixing portion of an adjacent stage through which said second liquid is pumped through the centrifugal action of said separatnig means.

14. Apparatus for providing rapid contact and separation of a first relatively light liquid and a second relatively heavy liquid which are at least partially immiscible for transferring a constituent from one liquid to the other, said apparatus including in combination, a plurality of stages each of which comprises means for combining and mixing said liquids and means for separating said mixed liquids, said mixing means including relatively rotating parts for mixing said liquids and for feeding said mixed liquids from said mixing means to said separating means, said separating means having close spaced conical portions, a single shaft extending through said apparatus for rotating parts of said mixing means and said conical portions of said stages for imparting centrifugal action to said liquids for separating said first and second liquids, with said first and second liquids passing between said conical portions in opposite directions and thereby passing over each other so that substantial contact is provided between said liquids for transferring said one constituent to said other liquid, and means for interconnecting said stages so that countercurrent flow between said first and second liquids is provided.

15. Apparatus for extracting one constituent from a feed liquid by the use of a second liquid which is selective for said one constituent, wherein said feed liquid and said second liquid have substantially different densities, said apparatus including at least one stage comprising relatively rotating means for thoroughly mixing said feed liquid and said second liquid to effect distribution of said one constituent therebetween, a centrifuge having means for receiving said mixed liquids and for separating said second liquid and said feed liquid, said rotating means applying said mixed liquids to said centrifuge, said centrifuge having at least one vane and means for rotating said vane for imparting rotary action to said mixed liquids, said centrifuge including disc means for imparting centrifugal action to said mixed liquids, whereby said liquids are separated and pass over each other in opposite directions so that substantial contact is provided therebetween for effecting a distribution process therebetween so that a large part of said one constitutent is transferred to said second liquid, means forming a first passage extending adjacent the outer edge of said disc means for removing the more dense liquid, and means forming a second passage extending inwardly of said first passage for removing the less dense liquid.

16. Apparatus for extracting one constituent from a feed liquid by the use of a solvent which is selective for said one constituent, said apparatus including a housing having therein at least one stage comprising means for thoroughly mixing said feed liquid and said solvent and means for separating said solvent and said feed liquid, a rotary shaft and means to rotate the same, said mixing means including rapidly rotating portions on said shaft for imparting rotary motion to said mixture and portions on haid housing for deflecting the mixture toward said separating means, said separating means including means for receiving said mixture and close spaced nested frustoconical discs connected to rotate with said shaft so that said liquid mixture and said solvent each flow therebetween in opposite directions respectively and substantial rubbing contact is provided for transferring said one constituent to said solvent.

References Cited in the file of this patent

UNITED STATES PATENTS

| | | |
|---|---|---|
| 1,061,656 | Black | May 13, 1913 |
| 1,953,618 | Kramer | Apr. 3, 1934 |
| 2,000,606 | Othmer | May 7, 1935 |
| 2,036,924 | Coutor | Apr. 7, 1936 |
| 2,063,789 | Burke | Dec. 8, 1936 |
| 2,189,230 | Sheldon | Feb. 6, 1940 |
| 2,234,921 | Webb | Mar. 11, 1941 |
| 2,622,797 | Hemfort | Dec. 23, 1952 |

FOREIGN PATENTS

| | | |
|---|---|---|
| 567,959 | Great Britain | Mar. 9, 1944 |

OTHER REFERENCES

Walker "Kontinuerlicliche Olraffination Mittels Zentrifugalseparierung," Petroleum Zeitschrift, vol. 30, No. 32, pages 1 and 2, Aug. 8, 1934. (Copy in Div. 31.)